US009976199B2

(12) United States Patent
Kuttiyiel et al.

(10) Patent No.: US 9,976,199 B2
(45) Date of Patent: May 22, 2018

(54) SYNTHESIS OF AU-INDUCED STRUCTURALLY ORDERED AUPDCO INTERMETALLIC CORE-SHELL NANOPARTICLES AND THEIR USE AS OXYGEN REDUCTION CATALYSTS

(71) Applicant: Brookhaven Science Associates, LLC, Upton, NY (US)

(72) Inventors: Kurian A. Kuttiyiel, New Hyde Park, NY (US); Kotaro Sasaki, Hauppauge, NY (US); Radoslav R. Adzic, East Setauket, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 0 days. days.

(21) Appl. No.: 15/305,123

(22) PCT Filed: Apr. 22, 2015

(86) PCT No.: PCT/US2015/027037
§ 371 (c)(1),
(2) Date: Oct. 19, 2016

(87) PCT Pub. No.: WO2015/164474
PCT Pub. Date: Oct. 29, 2015

(65) Prior Publication Data
US 2017/0037494 A1    Feb. 9, 2017

Related U.S. Application Data

(60) Provisional application No. 61/982,628, filed on Apr. 22, 2014.

(51) Int. Cl.
*B01J 23/89* (2006.01)
*B01J 35/00* (2006.01)
(Continued)

(52) U.S. Cl.
CPC ............ *C22C 5/04* (2013.01); *B01J 23/8913* (2013.01); *B01J 35/008* (2013.01);
(Continued)

(58) Field of Classification Search
CPC  B01J 23/8913; B01J 35/0013; B01J 35/0033; B01J 35/008; B22F 1/0018;
(Continued)

(56) References Cited

U.S. PATENT DOCUMENTS 7,507,495 B2    3/2009  Wang et al.
7,632,601 B2   12/2009  Adzic et al.
(Continued)

FOREIGN PATENT DOCUMENTS

WO    2011112608 A1    9/2011

OTHER PUBLICATIONS

Kuttiyiel, K. A., Nature Communications, vol. 5, Article No. 5185, doi:10.1038/ncomms6185, supplementary information included, Nov. 6, 2014.
(Continued)

*Primary Examiner* — Cam N. Nguyen
(74) *Attorney, Agent, or Firm* — Dorene M. Price; Lars O. Husebo

(57) ABSTRACT

Embodiments of the disclosure relate to intermetallic nanoparticles. Embodiments include nanoparticles having an intermetallic core including a first metal and a second metal. The first metal may be palladium and the second metal may be at least one of cobalt, iron, nickel, or a combination thereof. The nanoparticles may further have a shell that includes palladium and gold.

6 Claims, 5 Drawing Sheets

(51) Int. Cl.
*B22F 1/00* (2006.01)
*B22F 1/02* (2006.01)
*C22C 1/04* (2006.01)
*C22C 19/07* (2006.01)
*C22C 5/04* (2006.01)
*B22F 9/24* (2006.01)
*B01J 37/16* (2006.01)
*H01M 4/90* (2006.01)
*H01M 4/92* (2006.01)

(52) U.S. Cl.
CPC ....... *B01J 35/0013* (2013.01); *B01J 35/0033* (2013.01); *B01J 37/16* (2013.01); *B22F 1/0018* (2013.01); *B22F 1/025* (2013.01); *B22F 9/24* (2013.01); *C22C 1/0491* (2013.01); *C22C 19/07* (2013.01); *H01M 4/9041* (2013.01); *H01M 4/921* (2013.01); *B01J 35/006* (2013.01); *B01J 2523/00* (2013.01)

(58) Field of Classification Search
CPC .......... B22F 1/025; B22F 9/24; C22C 1/0491; C22C 19/07; C22C 5/04
See application file for complete search history.

(56) References Cited

U.S. PATENT DOCUMENTS

| | | | |
|---|---|---|---|
| 7,634,461 B2 * | 12/2009 | Oral .................. | G06F 17/30011 |
| 7,704,919 B2 | 4/2010 | Adzic et al. | |
| 8,114,807 B2 * | 2/2012 | Porter .................. | C07C 29/17 |
| | | | 502/326 |
| 8,129,306 B2 * | 3/2012 | Myers .................. | B01J 23/89 |
| | | | 502/325 |
| 8,178,202 B2 | 5/2012 | Halas et al. | |
| 8,703,639 B2 * | 4/2014 | Wan .................. | B01J 23/8906 |
| | | | 502/184 |
| 9,187,806 B2 * | 11/2015 | Singh .................. | C09K 5/10 |
| 9,533,352 B2 * | 1/2017 | Singh .................. | B22F 9/24 |
| 2004/0137220 A1 * | 7/2004 | Tsuchiya .................. | G11B 5/00 |
| | | | 428/328 |
| 2006/0083694 A1 * | 4/2006 | Kodas .................. | B01J 13/0043 |
| | | | 424/46 |
| 2006/0177728 A1 | 8/2006 | Adzic et al. | |
| 2009/0192030 A1 * | 7/2009 | Myers .................. | B01J 23/89 |
| | | | 502/184 |
| 2010/0216632 A1 | 8/2010 | Adzic et al. | |
| 2011/0281991 A1 | 11/2011 | Chou et al. | |
| 2013/0084502 A1 * | 4/2013 | Singh .................. | B22F 9/24 |
| | | | 429/232 |
| 2015/0017565 A1 | 1/2015 | Adzic et al. | |
| 2015/0249252 A1 * | 9/2015 | Abruna .................. | H01M 4/921 |
| | | | 429/524 |
| 2016/0059306 A1 * | 3/2016 | Singh .................. | B22F 9/24 |
| | | | 428/544 |
| 2017/0274363 A1 * | 9/2017 | Duan .................. | B01J 31/121 |

OTHER PUBLICATIONS

International Search Report and Written Opinion of the International Searching Authority, dated Jul. 22, 2015.

* cited by examiner

SYNTHESIS OF AU-INDUCED STRUCTURALLY ORDERED AUPDCO INTERMETALLIC CORE-SHELL NANOPARTICLES AND THEIR USE AS OXYGEN REDUCTION CATALYSTS

This application is a U.S. national stage application and claims the benefit under 35 U.S.C. § 371 of International Application No. PCT/US2015/027037 filed on Apr. 22, 2015, which claims the benefit under 35 U.S.C. 119(e) of U.S. Provisional Application No. 61/982,628 filed on Apr. 22, 2014, the disclosure of which is incorporated herein in its entirety.

This invention was made with Government support under contract numbers DE-AC02-98CH10886 and DE-SC0012704 awarded by the U.S. Department of Energy. The Government has certain rights in the invention.

FIELD OF THE INVENTION

This disclosure relates generally to structured core-shell compounds. In particular, it relates to structured core-shell compounds which may be used as electrodes and catalysts.

BACKGROUND

Active, durable metal nanocatalysts with low platinum (Pt) content are desired for various purposes including energy storage devices such as fuel cells, lowering the cost of hydrogen generators through water electrolysis, and in Li-ion or Li-air batteries. One form of suitable metal nanocatalysts is core-shell nanoparticles where a thin platinum shell surrounds a non-platinum core. While several core-shell nanoparticles with a narrow distribution of particle size have displayed high catalytic performance, methods to produce them in large quantity, uniformly and inexpensively are desirable. These approaches, to some degree, decrease Pt utilization, but may not fully solve the problem of Pt dependence. For example, to substitute the active but expensive Pt-based oxygen reduction reaction (ORR) catalyst, recent advances have been made to develop low cost alternatives such as metal-N complex on carbon matrixes, perovskites, spinel oxides, and carbon-based nanomaterials. However, these catalyst materials may not meet the requirements of combined high catalytic activity, better durability and low cost. Moreover, catalyst systems other than those based on Pt, systems may not act as an electrocatalyst in both anion-exchange and proton-exchange membrane fuel cells. Therefore, there is a need for low cost efficient alternatives to Pt catalysts.

SUMMARY

This disclosure provides embodiments of nanoparticles having an intermetallic core including a first metal and a second metal. The first metal may be palladium and the second metal may be at least one of cobalt, iron, nickel, or a combination thereof. The nanoparticles may further have a shell that includes palladium and gold.

In an embodiment, a nanoparticle includes intermetallic palladium and cobalt. At least parts of the intermetallic palladium and cobalt may have a trigonal and/or rhombohedral symmetry. The nanoparticle may have an average diameter of between about 1 nm and about 100 nm, or between about 2 nm and about 10 nm.

In another embodiment, a nanoparticle includes an intermetallic core comprising a first metal and a second metal and a shell comprising palladium and gold. The first metal is palladium and the second metal is at least one of cobalt, iron, nickel, or combination thereof. At least parts of the intermetallic core may comprise a trigonal and/or rhombohedral symmetry. The nanoparticle may have an average diameter of between about 1 nm and about 100 nm, or between about 2 nm and about 10 nm. The shell may be conformal with the intermetallic core.

In another embodiment, a method of producing a nanoparticle is provided. The method includes providing seed nanoparticles suspended in a liquid, wherein the seed nanoparticles comprises at least one of cobalt, iron, nickel, or combinations thereof; adding a solution comprising palladium ions and gold ions; reducing the palladium ions and the gold ions to form a shell comprising palladium and gold on the seed nanoparticles; and heating the seed nanoparticles with the shell to form structurally ordered nanoparticles. The seed nanoparticles may be made by reducing a solution of at least one of cobalt ions, iron ions, nickel ions, or combinations thereof.

The nanoparticles may be used in, for example, electrocatalysts, electrodes, electrolyzers, or oxygen reduction catalysts.

For an oxygen reduction catalyst containing the nanoparticles a cyclic voltammogram between 0.5 and 1.00 V performed in basic conditions may show no change in oxidation/reduction peaks after 10,000 cycles.

DETAILED DESCRIPTION

Figure 1:
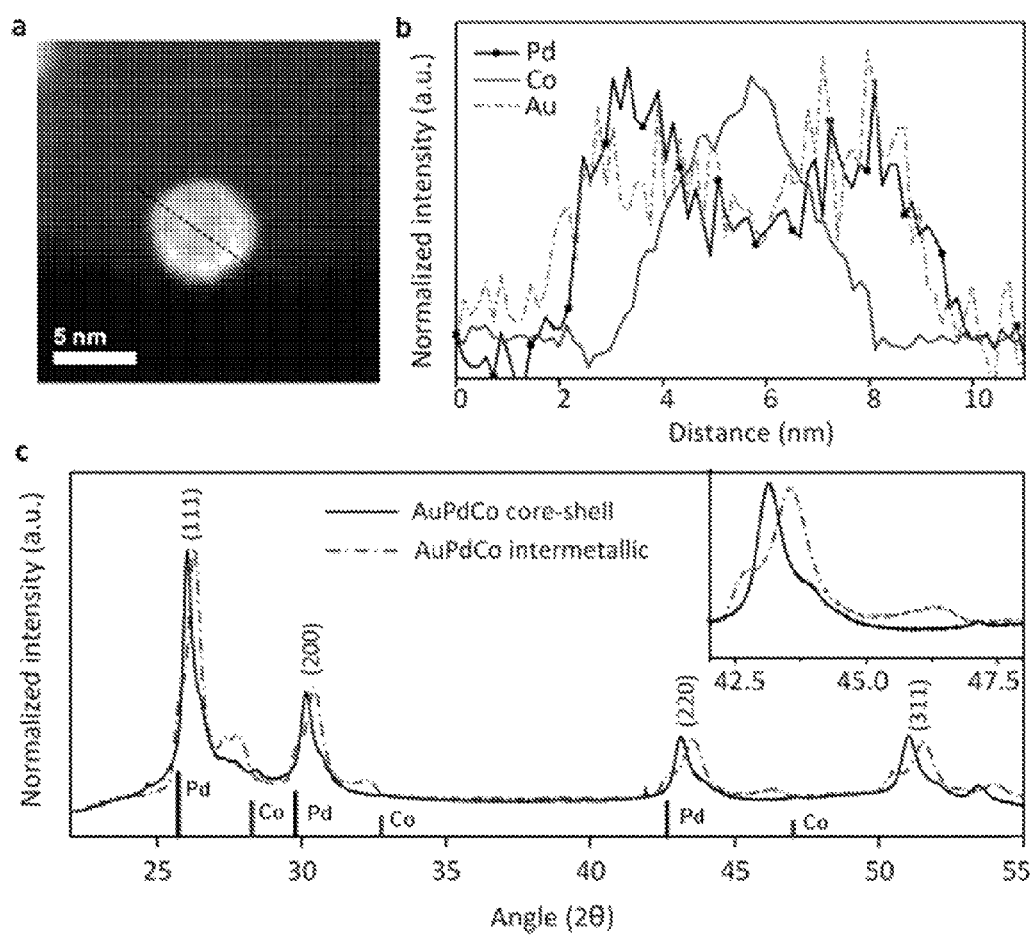
FIG. 1 show the STEM-EELS elemental line-scan profile and Synchrotron XRD patterns: (a,b) High angle annular dark-field-STEM image of a core-shell AuPdCo nanoparticle with its corresponding EELS line-scan profiles. Scale bar, 5 nm. (c) XRD patterns for core-shell and intermetallic AuPdCo nanoparticles. The vertical lines indicate the (111), (200) and (220) peak positions of pure Pd and Co reflections. The inset shows the enlarged region of the AuPdCo (220) diffraction peaks.

This disclosure provides for low cost efficient alternatives to Pt catalysts. Embodiments include nanoparticles made from intermetallic palladium and at least one second metal which may be cobalt, iron, nickel, or a combination thereof. In one embodiment the second metal is cobalt.

At least parts of the intermetallic palladium and second metal may have a trigonal symmetry and/or rhombohedral symmetry.

The nanoparticles may be fully or partially enclosed in a shell comprising palladium and gold. The shell may conformal with the intermetallic nanoparticle.

The nanoparticle may have an average diameter of between about 1 nm and about 100 nm. All individual values and subranges between about 1 nm and about 100 nm are included herein and disclosed herein; for example, the average diameter may be from a lower limit of about 1, 2, 3, 4, 5, 6, 7, 8, 9, 10, 11, 12, 13, 14, 15, 16, 17, 18, 19, 20, 21, 22, 23, 24, or 25, 30, 40, 50, or 60 nm to an upper limit of about 5, 6, 7, 8, 9, 10, 11, 12, 13, 14, 15, 16, 17, 18, 19, 20, 21, 22, 23, 24, 25, 26, 27, 28, 29, 30, 40, 50, 60, 70, 80, 90, 95, or 100 nm. In certain embodiments, the average diameter is between about 2 and 10 nm or between about 4 and 8 nm.

The nanoparticles may have core-shell structure with mole fraction of $Au_xPd_yCo_z$. x is between about 5 and 20. All individual values and subranges between about 5 and about 20 are included herein and disclosed herein; for example, x may be from a lower limit of about 5, 6, 7, 8, 9, 10, 11, 12, 13, 14, 15, 16, 17, or 18 to an upper limit of about 7, 8, 9, 10, 11, 12, 13, 14, 15, 16, 17, 18, 19, or 20. y is between about 20 and 60. All individual values and subranges between about 20 and about 60 are included herein and disclosed herein; for example, y may be from a lower limit of about 20, 25, 30, 35, 40, 45, or 50, to an upper limit of about 30, 35, 40, 45, 50, 55, or 60. z is between about 30 and 70. All individual values and subranges between about 30 and about 70 are included herein and disclosed herein; for example, z may be from a lower limit of about 30, 25, 30, 35, 40, 45, or 50, to an upper limit of about 35, 40, 45, 50, 55, 60, 65, or 70. In one embodiment x is 10, y is 40, and z is 50.

Embodiments of the nanoparticles may have core-shell structures with a core of palladium and at least one second metal which may be cobalt, iron, nickel, or a combination thereof. The core may be intermetallic as opposed to an alloy. The palladium and the at least one second metal are ordered into different sites in the structure, with distinct local environments and a well-defined, fixed stoichiometry. For example, the structure of the intermetallic core may include alternate layers of palladium atoms and second metal atoms. Alternatively the structure of the intermetallic core may include two layers of the second metal atoms in between two layers of the palladium metal atoms. The shell may be in certain embodiments include gold-palladium alloy.

Embodiments also include methods of producing the nanoparticles, such as described in *Nature Communications* 5, Article number: 5185, doi:10.1038/ncomms6185 (including Supplementary Information), the contents of which is incorporated herein in its entirety.

An embodiment of a method includes providing seed nanoparticles suspended in a liquid. The seed nanoparticles include at least one of cobalt, iron, nickel, or combinations thereof. A solution comprising palladium ions and gold ions are then added and the palladium ions and the gold ions are reduced to form a shell comprising palladium and gold on the seed nanoparticles. The particles are then heated to form structurally ordered nanoparticles.

Any suitable gold and palladium solution are contemplated. In certain embodiments, an aqueous solution is provided. In certain embodiments the gold ions are provided from $HauCl_4H_2O$ and palladium ions from $Pd(NO_3)_2H_2O$. Any method of reducing the metal ion is contemplated. In one embodiment the metal salts are reduced using a chemical reducing agent, such as $NaBH_4$. The reduction may proceed in the presence of a stabilizer such as trisodium citrate.

The seed nanoparticles may be formed from any suitable method. In one embodiment the seed nanoparticles are formed from reducing a metal ion salt solution of the cobalt, iron, nickel, or combinations thereof. In an embodiment the metal ion salt is $CoCl_2*6H_2O$. Any method of reducing the metal ion is contemplated. In one embodiment the metal salts are reduced using a chemical reducing agent, such as $NaBH_4$. The reduction may proceed in the presence of a stabilizer such as trisodium citrate.

The particles may be dried and annealed in temperatures of between about 700° C. and about 1000° C. All individual values and subranges between about 500° C. and about 1000° C. are included herein and disclosed herein; for example, the temperature may be from a lower limit of about 500, 550, 600, 650, 700, 725, 750, 775, 800, 825, 850, or 900° C. to an upper limit of about 600, 650, 700, 750, 775, 800, 825, 850, 900, 950, or 1000° C. In certain embodiments, the temperature is about 800° C.

At least parts of the intermetallic palladium and second metal may have a trigonal symmetry and/or rhombohedral symmetry. In some embodiments, the substantially all the intermetallic palladium and second metal have a trigonal symmetry and/or rhombohedral symmetry.

The particles may be used as for example electrolyzers, electrodes, catalysts, and electrocatalyst. The particles exhibit comparable activity to conventional platinum catalysts in both acid and alkaline media. In one embodiment, an electrocatalyst has precious metal activity at 0.9V of at least 0.14 A/mg in acidic conditions and/or a precious metal activity at 0.9V of at least 0.13 A/mg in basic conditions. In an embodiment the particles may be used as oxygen reduction catalysts. The oxygen reduction catalyst may display a cyclic voltammogram between 0.5 and 1.00 V performed in basic conditions with no change in oxidation/reduction peaks after 10,000 cycles.

EXAMPLES

Synthesis: Carbon-supported AuPdCo nanoparticles were prepared by first mixing Vulcan carbon XC72R with $CoCl_2 \cdot 6H_2O$ salt in aqueous solution. Later, trisodium citrate dihydrate at a ratio of 1:3 with respect to Co salt was mixed with the carbon mixture while simultaneously purging the mixture with Ar under an ultrasonic bath for an hour. The Co salt was then reduced by adding $NaBH_4$ while simultaneously purging the mixture with Ar. After 5 min of reaction time, a $Pd(NO_3)_2H_2O$ and $HAuCl_4H_2O$ salt mixture was added to the Co carbon mixture and sonicated for an hour so as to obtain AuPdCo core-shell nanoparticles. The final mixture obtained was washed and rinsed with Millipore water, and then dried. The nanoparticles obtained had a core-shell structure with mole fraction of $Au_{10}P_{40}Co_{50}$. The as-prepared AuPdCo/C catalysts were annealed at 500 and 800° C. in $H_2$ stream for 30 min in a tube furnace. The latter temperature helped to obtain an atomic structure ordering of the nanoparticles while the former preserved the core-shell structure.

Electrochemical testing: Electrochemical measurements were conducted using an RDE setup with a potentiostat (CHI 700B potentiostat (CH Instruments)). Catalyst ink was prepared by ultrasonic mixing of 5 mg of catalyst in 5 ml of $H_2O$. The catalyst ink of 10-15 µl was dropped on a glassy carbon substrate of the RDE electrode (5 mm in diameter, 0.196 $cm^2$). After drying in air, the electrode was covered with 10 µl of $H_2O$ diluted Nafion solution (2 µg per 5 µl) and dried again. All electrochemical measurements were carried out in an Ar-purged 0.1 M KOH/0.1 M $HCl_4$ aqueous solution using a three-electrode cell with a Pt wire as the counter electrode and a leak-free reference electrode (Ag/AgCl). All the potentials are reported with respect to RHE. The electrolytes were prepared from potassium hydroxide solution (Fluka) and perchloric acid (Fisher scientific), and MilliQ UV-plus water. Polarization curve for the ORR was obtained in $O_2$-saturated solution by scanning the potential from 0 to 1.1 V versus RHE (scan rate: 10 mV $s^{-1}$; rotation rate: 225, 400, 625, 900, 1,225, 1,600 and 2,025 r.p.m.). For calculating the activity of the catalysts, the kinetic currents for ORR were determined using the Koutecky-Levich equation.

Characterization: Synchrotron XRD measurements were carried out at National Synchrotron Light Source (NSLS), Brookhaven National Laboratory (BNL) using X18A beamline. The wavelength of X-ray used was 1.0 Å. Rigaku Ultima diffractometer using Cu Kα radiation (1.54056 Å) was used for other XRD patterns. STEM and EELS studies were conducted on the catalyst using Hitachi (HD-2700C) aberration-corrected STEM at the Center for Functional Nanomaterials (CFN), BNL. A 1.4 Å electron probe with probe current ~50 pA and an electron source with energy resolution of 0.35 eV were used in this study. The microscope was equipped with a cold field emission electron source and a high-resolution Gatan Enfina energy-loss spectrometer. Element-sensitive EELS mapping was carried out for Au M-edge, Pd M-edge and Co L-edge across single solid particles. HRTEM and electron diffraction analysis were carried out using the JEM-ARM200F microscope equipped with cold field emission gun and double aberration correctors at the accelerating voltage of 200 kV. The HRTEM image and diffractograms were simulated using computer codes based on the multislice method. The calculated images were convoluted with a 0.06 nm FWHM Gaussian spread function to compare with the experiments. The fcc structure can be also described by a hexagonal lattice with $a_h=1/\sqrt{2}\ a_c$ and $c_h=\sqrt{3}\ a_c$, where $a_h$ and $c_h$, and $a_c$ denote the lattice parameters of hexagonal lattice and fcc lattice, respectively. The relationship between the fcc and hexagonal lattice: $(111)_2 \| (001)_h$.

Structural properties of AuPdCo: Initially, core-shell structures of AuPdCo nanoparticles had an average diameter of 1 nm. The structures of the as-obtained core-shell nanoparticles were controlled by annealing at different temperatures under a flowing $H_2$ gas atmosphere. The nanoparticles tend to grow when annealed at 500° C. in $H_2$ for 30 min attaining an average diameter of 4 nm while maintaining their core-shell structure. As illustrated in FIG. 1a,b, the nanoparticles have a core-shell structure with AuPd atoms on the surface and Co in its core. AuPdCo annealed at 500° C. sample was used as a reference for the disordered core-shell AuPdCo catalysts. The high angle annular dark-field images as shown in FIG. 1a, whose contrast is directly related to atomic number Z, reveals that the intensity profile for Au and Pd is nearly depleted in the centre of the nanoparticle, whereas for Co it is enriched in the centre. EELS line-scan profile indicates the distribution of Au, Pd and Cocomponents in a representative single nanoparticle, where the Pd shell thickness measured is around 0.9-1.2 nm and Au atoms are distributed on the surface. To attain an intermetallic ordered structuring of the nanoparticles, the as-obtained core-shell AuPdCo nanoparticles were annealed at 800° C. for 30 min, which reorganizes the PdCo atoms to a well-ordered structure with Au atoms on the surface. Because this behavior of restructuring of core-shell PdCo nanoparticles to ordered intermetallic structure was not observed in the absences of Au atoms, this arrangement of PdCo atoms may be attributed to the presence of Au atoms that may behave like a matrix or stabilizer shells preventing the agglomeration of nanoparticles, meanwhile the temperature having a role in restructuring the PdCo atoms.

Figure 2:
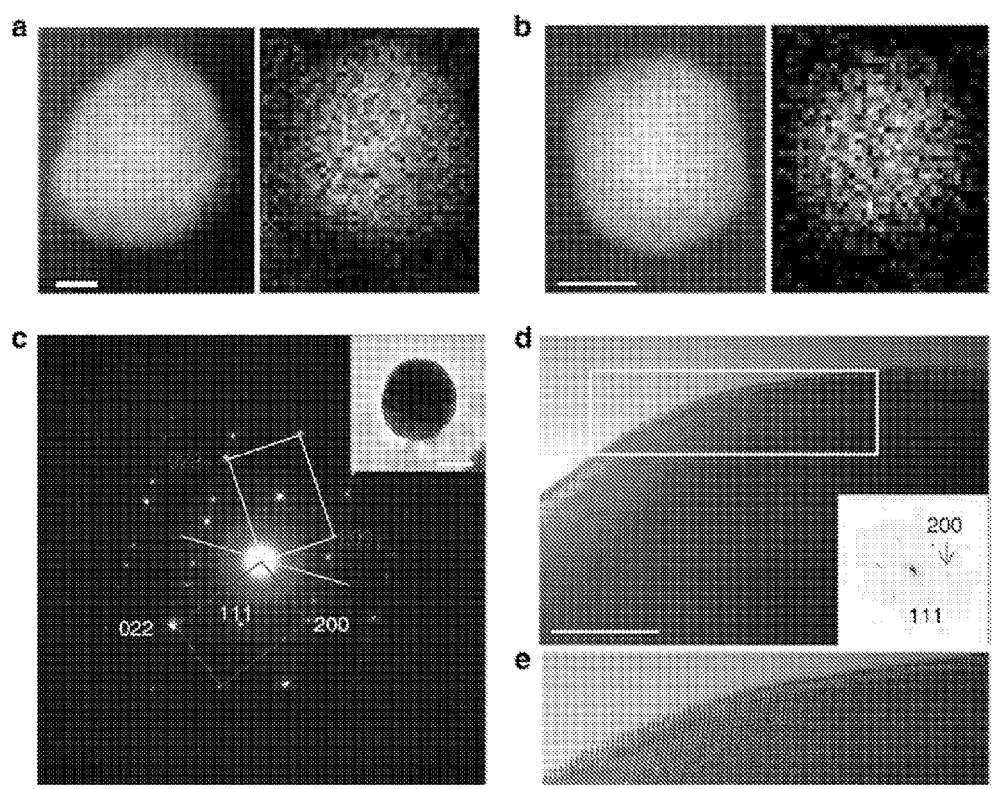
FIG. 2 show the STEM HRTEM and EDP along with two-dimensional EELS mapping. (a,b) Two-dimensional EELS mapping of Pd M-edge and Co L-edge from a single intermetallic AuPdCo nanoparticle. Scale bar, 2 and 5 nm, respectively. (c) EDP from a single particle as shown in the inset (scale bar, 50 nm) viewed along [01-1] direction. The EDP can be indexed as (01-1)* and (0-11)T* (subscript T denotes twin) patterns of fcc. The rectangles outline the diffraction spots of the matrix and the twin whereas the line shows the (111) twin plane. (d) HRTEM image from the top part of the particle in c. Scale bar, 10 nm. The inset is the diffractogram of the image. (e) Magnified image from d showing misfit between the shell and the core.
Figure 3:
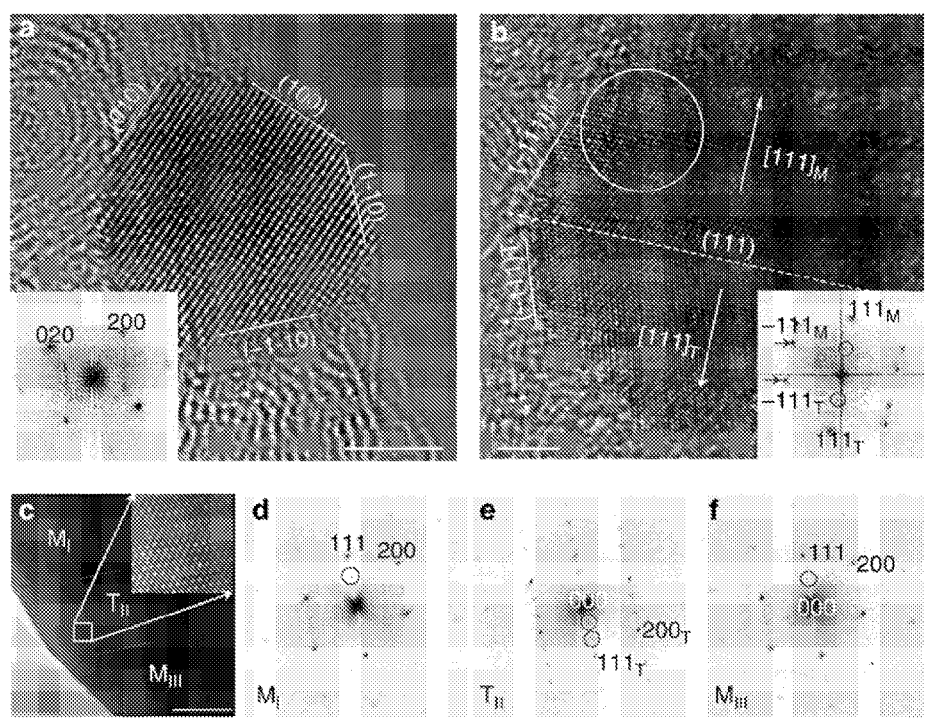
FIG. 3 show the structural ordering of intermetallic AuPdCo nanoparticles. (a,b) HRTEM images from smaller nanoparticles viewed along [001] and [0-11] direction, respectively. Both scale bars, 3 nm. The diffractograms are embedded in the images. Ordering along [111] direction is visible in b as indicated by the circle. Superlattice spots are also visible in the diffractogram as indicated by the red circles in the inset of b. (c) HRTEM image from a large particle. The red lines in c mark the twin boundaries. A close view (inset) shows the ordering along [111] direction. Scale bar, 10 nm. (d-f) The diffractograms from area MI, TII and MIII, respectively. Superlattice spots are circled.

Synchrotron X-ray diffraction (XRD) measurements as shown in FIG. 1c reveal some insights into the transformation of AuPdCo nanoparticles. The XRD patterns for both samples have four major diffraction peaks corresponding to (111), (200), (220) and (311) peaks that matches well to that expected from face-centered cubic (fcc) structure. Incorporation of Co into the Pd lattices shifts the peak positions to higher angles indicating lattice contraction. The intermetallic phase of the nanoparticles may have caused the peak for further contraction evident from the peak shifts to much higher angle than core-shell nanoparticles. The small shoulder-peak at 2θ angles of 42.6° for (220) reflection (inset of FIG. 1c) is due to the alloying effect of surface Au with Pd. Density functional theory studies have shown that Au atoms preferentially remain on the Pd surface by the segregation process. The powder XRD patterns did not show the intermetallic phases of the nanoparticles. However, as discussed below, the electron microscopic analysis revealed the intermetallic structuring of the nanoparticles that has resulted in forming ordered Pd and Co planes (FIGS. 2 and 3). The small XRD peak positions at 2θ angle of 46.3° near the pure Co-metal (220) reflections (inset of FIG. 1c) may have been caused by the Co planes. The particle size calculated by Scherer equation using the (220) peaks was 6.8 nm and the lattice contraction was 0.9% more than the core-shell nanoparticles.

To understand the microstructure of intermetallic AuPdCo nanoparticles, bright field TEM images along with EELS two-dimensional imaging were performed. The images revealed that generally the particles were spherical with an average diameter of 6.7 nm, which corresponds well to the value determined in the XRD experiments. Few large particles varying in size between 20- to 90-nm were found, while most particles (>~90%) were between 3- and 10-nm. The EELS mapping of Pd (M-edge) and Co (L-edge) from a single representative nanoparticle are shown in FIG. 2a,b, indicating an overall homogeneous distribution of Pd and Co atoms. FIG. 2c shows a TEM image of a single large particle (inset) along with its EDP respectively viewed along the [01-1] direction. The EDP was indexed as fcc with lattice parameter of ~0.38 nm with (111) twin planes as shown by the diffraction spots of the matrix and the twin. To have a better insight to the arrangement of the atoms in the particle, a cropped high-resolution TEM (HRTEM) image from the top part of the particle is shown in FIG. 2d along with the diffractogram of the image in the inset. The HRTEM image in FIG. 2d is rotated about 49° with respect to the EDP as shown in FIG. 2c due to the magnetic lens in the microscope. When the HRTEM image is magnified as shown in FIG. 2e, the arrangement of atoms at the shell shows a misfit between the shell and the core demonstrating a PdAu alloy shell on the intermetallic arranged PdCo atoms.

The ordered intermetallic structure of the AuPdCo nanoparticles was often observed along [111] direction as shown in FIG. 3, viewed along the [001] and the [0-11] zone axis. The intermetallic structure of the AuPdCo nanoparticles can be determined by selected-area electron diffraction patterns and HRTEM. The HRTEM from smaller particles (FIG. 3a,b) clearly show the {100}, {110} and {111} facets. The (111) reflection twins are present in smaller particles as shown in FIG. 3b, which also reveals the ordering along [111] direction. The superlattice spots can be identified from smaller particles as shown in the embedded diffractogram (FIG. 3b) though they are weak. These spots could be easily identified from larger nanoparticles (50 nm) as shown in FIG. 3d-f. The (111) twinned boundaries (area TII) as indicated by the lines in FIG. 3c when magnified, clearly shows the ordering of atoms along the [111] direction. The diffractograms from area MI, TII and MIII are shown in FIG. 3d-f, respectively. Two superlattice spots (marked by the circles) between 000 and 111T in FIG. 3e was observed, confirming ordering along [111] direction. In fcc structure, normally Pd and Co randomly occupy at (111) planes. The ordering occurs when Pd occupies in one (111) plane, while Co occupies in the other two planes (3×(times) ordering), as shown in the simulated HRTEM). The simulated HRTEM image and diffractogram based on the structure model are in good agreement with the experiments (FIG. 3e). This ordering of Pd and Co along [111] direction reduces the fcc symmetry (Fm-3m) to a primitive trigonal symmetry (P-3m, a~0.266 nm and c~0.651 nm). A different type of ordering of PdCo atoms was observed in the diffractograms from area MI and MIII. Only one superlattice spot was observed between 000 and 111 (marked by the circles) in the diffractograms, indicating ordering along the [111] direction. This kind of ordering occurs when Pd and Co atoms alternately stack (2×ordering) along [111] direction. The simulated HRTEM image and diffractogram matches the observations from area MI and MIII very well. The observed ordering along [111] direction reduces the fcc symmetry to rhombohedral symmetry (R-3m, a~0.266 nm and c~1.303 nm).

Figure 4:
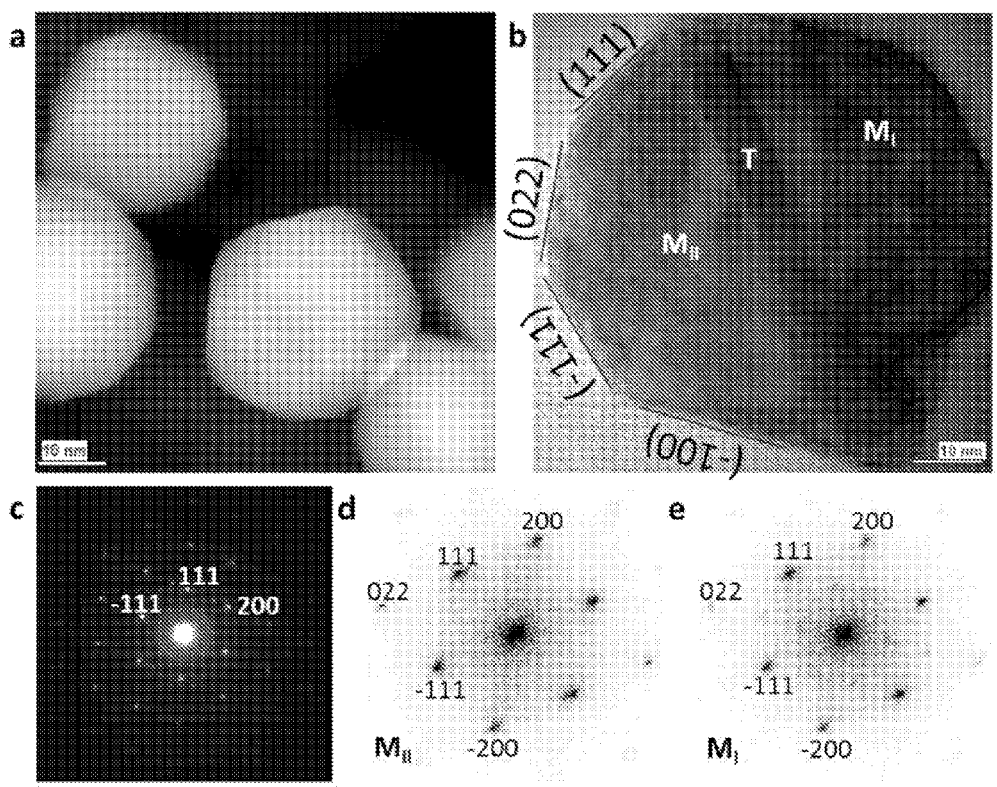
FIG. 4 show the multiple facets of AuPdCo nanoparticles along with its selected-area electron diffraction patterns. (a,b) STEM and HRTEM image of AuPdCo-intermetallic nanoparticles showing multiple facets, respectively. Both scale bars, 10 nm. (c) EDP of b as viewed along [0-11] direction. (d,e) The diffractograms from MII and MI, respectively.

Multiple low-index facets and superlattice spots of the structurally ordered AuPdCo nanoparticles were also viewed from other particles along the [0-11] zone axis as shown in FIG. 4. The HRTEM image in FIG. 4b clearly shows the twin boundaries and the smooth {111}, {110} and {100} facets of the particle. The EDP was indexed as fcc with lattice parameter of 0.376 nm with (111) twins. The diffractograms from MI and MII are shown in FIG. 4e,d, respectively with weak superlattice spots in $M_I$. Views along [0-11] and [001] direction from other nanoparticles show the ordered structure of the atoms along with antiphase domains, twin and facets. On the basis of the HRTEM images along with the appearance of superlattice spots in diffractograms that agree well with the diffractogram simulations, it can be confirmed that majority of the particles as spherical shaped ordered with twin boundaries and multiple facets.

Figure 5:
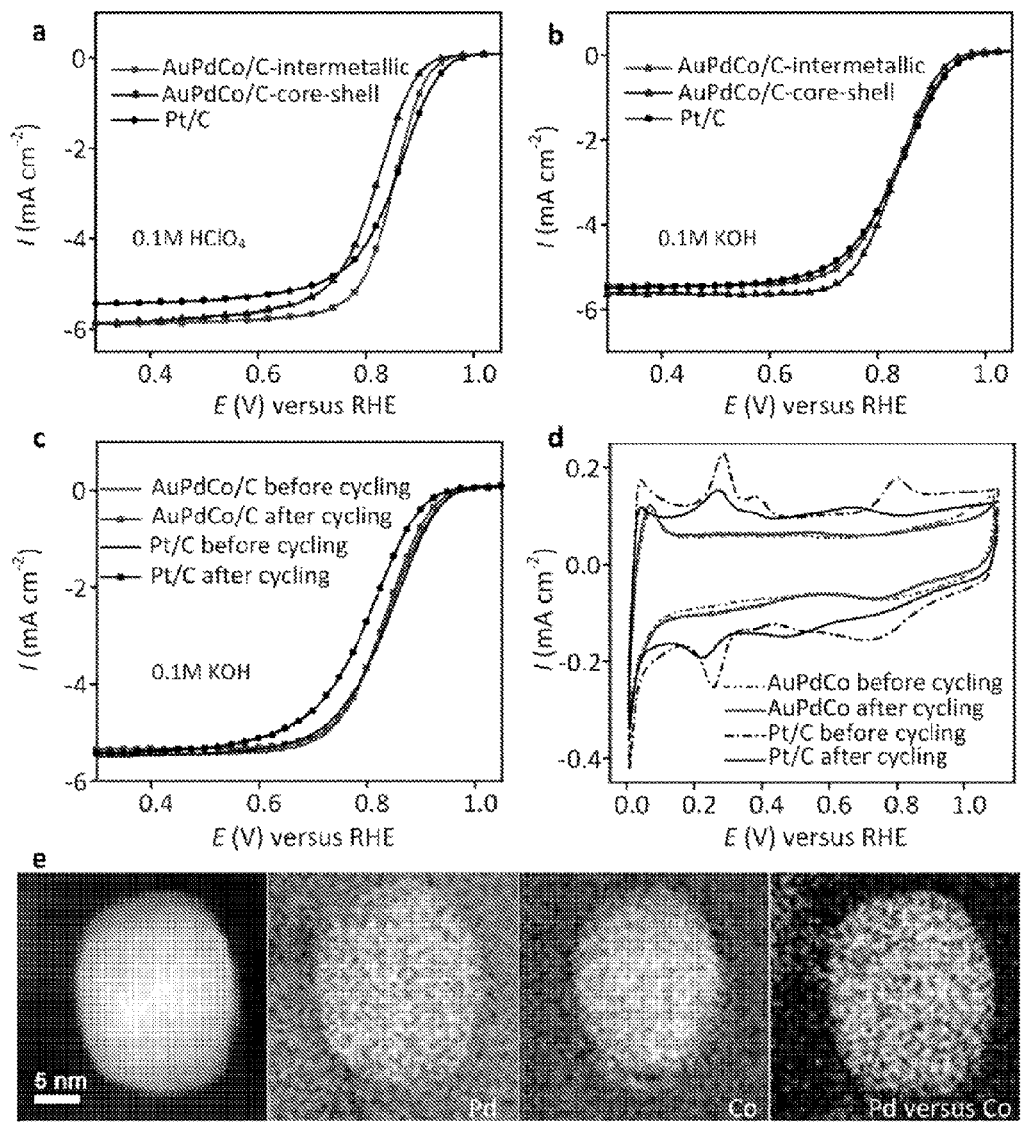
FIG. 5 show the ORR performance and structural stability of the catalyst. (a,b) ORR Polarization curves for AuPdCo/C-intermetallic and core-shell catalyst along with Pt/C catalyst on an RDE electrode in 0.1 M HClO4 and 0.1 M KOH, respectively. Precious metal loading was 7.65 μg cm−2 for AuPdCo catalysts and 6.0 μg cm−2 for Pt catalyst. (c,d) ORR polarization and cyclic voltammetry curves of AuPdCo/C-intermetallic and Pt/C catalysts before and after 10,000 cycle test between 0.6 and 1.0 V in 0.1 M KOH. (e) HRTEM image of a single AuPdCo-intermetallic nanoparticle along with its EELS mapping and overlapped mapping (Pd and Co) showing the intermetallic structure of PdCo atoms after electrochemical cycling. Scale bar, 5 nm.

Catalytic activity of AuPdCo nanostructures: The durability of the catalysts was evaluated by potential cycling between 0.5 and 1.00 V for 10,000 cycles in air-saturated 0.1 M KOH solution at a scan rate of 50 mV s$^{-1}$. The CV of the nanoparticles as shown in FIG. 5d obtained after 10,000 cycles show no change in the oxidation/reduction peaks indicating that the structure is intact. The core-shell-structured AuPdCo/C catalyst lost some of its electrochemical surface area as shown in a CV after 10,000 potential cycles. Pt/C catalyst too showed (FIG. 5d) some deterioration in the oxidation/reduction peaks which furthermore impacts the ORR activity. After 10,000 cycles, the Pt/C also revealed in previous studies 16, results in the decaying of the redox peaks clearly indicating its poor stability. The ORR activity measured in terms of half-wave potential, as illustrated in FIG. 5c, decays ~30 mV for Pt/C, 19 mV for AuPdCo/C-core-shell catalysts after 10,000 electrochemical cycles whereas AuPdCo-intermetallic catalyst stays sturdy with no change in its half-wave potential. To get a better insight as to the particle size having an important role in the degradation mechanism, the intermetallic catalyst was compared with the Pt/C catalyst annealed using the same parameters of that of intermetallic nanoparticles. The high-temperature annealed Pt/C catalyst (9 nm particle size; suffered a loss of 18 mV in its half-wave potential after 10,000 cycles, concurrent with the previous reports that larger particle size can reduce the rate of degradation. The structural stability of AuPdCo/C-intermetallic nanoparticles after electrochemical cycling was verified by ADF-STEM images and EELS elemental mapping as shown in FIG. 5e. Though the surface Co may have been leached away, the intermetallic structures of the PdCo nanoparticles along with surface Au atoms were preserved. It's for sure that the Auclusters on the surfaces promote the enhanced stability of this catalyst, but the electronic effect due to the structural ordering and the formation of smooth, high-coordinated surfaces also contribute to the increase in the durability. The durability of the AuPdCo-intermetallic catalyst for ORR in acid after 3,000 cycles showed a loss of 20% in ECSA and 45 mV decay in half-wave potential. In general intermetallic structures are more stable than their counterparts, but then the surface Pd might be leaching off creating vacancies further deteriorating the catalyst due to the harsh acid environment. Further optimization of composition of the AuPdCo-intermetallic catalyst by varying the ratio of Au, Pd and Co precursors can provide an enhancement to the stability issues in acid media. In addition, these nanoparticles showed much better durability and activity in acid solution by using it as anode catalyst for fuel cells. The results show that the intermetallic nanoparticles behave just like Pt catalyst for the hydrogen oxidation reaction (HOR) in acid.

The invention claimed is:
1. A nanoparticle, comprising:
    an intermetallic core comprising a first metal and a second metal, wherein the first metal is palladium and the second metal is at least one of cobalt, iron, nickel, or combination thereof, and the first metal and the second metal are ordered into different distinct sites of the intermetallic core; and
    a shell comprising palladium and gold.
2. The nanoparticle of claim 1, wherein at least parts of the intermetallic core comprises a trigonal symmetry.

3. The nanoparticle of claim 1, wherein at least parts of the intermetallic core comprises a rhombohedral symmetry.

4. The nanoparticle of claim 1, wherein the nanoparticle has an average diameter of between about 2 nm and about 10 nm.

5. The nanoparticle of claim 1, wherein the second metal is cobalt.

6. The nanoparticle of claim 1, wherein the shell is conformal with the intermetallic core.

* * * * *